(12) United States Patent
Kim et al.

(10) Patent No.: US 8,774,542 B2
(45) Date of Patent: *Jul. 8, 2014

(54) APPARATUS AND METHOD FOR MULTILAYER PICTURE ENCODING/DECODING

(71) Applicant: Samsung Electronics Co., Ltd., Suwon-si (KR)

(72) Inventors: Dae-Hee Kim, Suwon-si (KR); Min-Woo Park, Yongin-si (KR); Dae-Sung Cho, Seoul (KR); Woong-Il Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,579

(22) Filed: Jul. 19, 2013

(65) Prior Publication Data

US 2013/0300923 A1  Nov. 14, 2013

Related U.S. Application Data

(63) Continuation of application No. 13/232,131, filed on Sep. 14, 2011, now Pat. No. 8,494,294.

(60) Provisional application No. 61/382,594, filed on Sep. 14, 2010.

(51) Int. Cl.
*G06K 9/46* (2006.01)

(52) U.S. Cl.
USPC ............ 382/238; 382/232; 382/233; 382/239

(58) Field of Classification Search
USPC ......... 382/232, 233, 235, 236, 238, 239, 135, 382/155; 375/240.17, 240.16, E7.001; 348/E5.112, 27, 110; 356/71; 700/17, 700/83; 713/600
See application file for complete search history.

(56) References Cited

U.S. PATENT DOCUMENTS 6,577,352 B1    6/2003  Park et al.
8,494,294 B2 *  7/2013  Kim et al. ...................... 382/238

FOREIGN PATENT DOCUMENTS

| KR | 10-0120729 B1 | 6/1995 |
| KR | 10-2008-0006607 A | 1/2008 |
| WO | 2006/109141 A1 | 10/2006 |
| WO | 2010/101420 A2 | 9/2010 |

OTHER PUBLICATIONS

International Search Report (PCT/ISA/210) with Written Opinion (PCT/ISA/237) dated Apr. 12, 2012 issued by the Interational Searching Authority in corresponding International Application No. PCT/KR2011/0006786.

* cited by examiner

*Primary Examiner* — Anh Do
(74) *Attorney, Agent, or Firm* — Sughrue Mion, PLLC

(57) ABSTRACT

Provided is a multilayer picture encoding/decoding apparatus and method for reducing a dynamic range of residual pictures occurring in enhancement layers. The multilayer picture encoding method includes performing format down-conversion on an input picture, and generating a lower layer bitstream by encoding the format down-converted input picture; performing format up-conversion by adaptively or selectively applying a 1-dimensional (1-D) prediction filter to a picture of the lower layer depending on whether a lower layer prediction flag is set or not; and calculating a residual picture between the input picture and the format up-converted picture, and generating an enhancement bitstream by encoding the calculated residual picture.

12 Claims, 3 Drawing Sheets

APPARATUS AND METHOD FOR MULTILAYER PICTURE ENCODING/DECODING

CROSS-REFERENCE TO RELATED APPLICATIONS

This is a Continuation of application Ser. No. 13/232,131 filed Sep. 14, 2011, now U.S. Pat. No. 8,494,294 which claims the benefit under 35 U.S.C. §119(a) of U.S. Provisional Patent Application No. 61/382,594, filed at the United States Patent and Trademark Office on Sep. 14, 2010, the entire disclosures of which are hereby incorporated by reference.

BACKGROUND

1. Field

The exemplary embodiments generally relate to an apparatus and method for encoding/decoding pictures (including images and videos) to provide high-quality services in various network and device environments, and more particularly, to a multilayer (or hierarchical) picture encoding/decoding apparatus and method for reducing a dynamic range of residual pictures occurring in enhancement layers.

2. Description of the Related Art

Multilayer picture encoding/decoding has been provided to satisfy Quality-of-Service (QoS) determined by various bandwidths of the network, various coding capabilities of devices, and user's control. To this end, an encoder generates multilayer picture bitstreams by one encoding, and a decoder decodes the multilayer picture bitstreams according to its decoding capabilities. Spatial, temporal and Signal-to-Noise Ratio (SNR) layer encoding may be achieved by this multilayer picture encoding/decoding, and depending on application scenarios, N-layer encoding/decoding (where N≥2) is also possible. For example, a base layer may encode pictures having a basic resolution, a first enhancement layer may perform additional encoding to obtain pictures having a higher resolution, and a second enhancement layer (higher than the first enhancement layer) may also perform additional encoding to obtain pictures having a much higher resolution.

When using lower layer pictures in an enhancement (or higher) layer encoding/decoding process, the conventional multilayer picture encoding/decoding apparatus copies lower layer pictures if enhancement layer pictures are equal to lower layer pictures in resolution, and performs up-sampling/conversion on lower layer pictures if the enhancement layer pictures are different from the lower layer pictures in resolution. If enhancement layers use lower layer pictures in this way, picture prediction efficiency may be reduced in the enhancement layers when encoding effects such as quantization errors are reflected intact in the lower layer pictures. Therefore, a scheme for reducing a dynamic range of residual pictures is required.

SUMMARY

An exemplary embodiment is to provide a multilayer picture encoding/decoding apparatus and method for reducing a dynamic range of residual pictures occurring in enhancement layers.

Another exemplary embodiment is to provide a multilayer picture encoding/decoding apparatus and method including format up-converters that perform 1-dimensional (1-D) filtering on lower layer pictures according to settings of a lower layer prediction flag.

In accordance with an exemplary embodiment, there is provided a multilayer picture encoding method for encoding an input picture for each layer independently. The multilayer picture encoding method includes performing format down-conversion on an input picture, and generating a lower layer bitstream by encoding the format down-converted input picture; performing format up-conversion by adaptively or selectively applying a 1-dimensional (1-D) prediction filter to a picture of the lower layer depending on whether a lower layer prediction flag is set or not; and calculating a residual picture between the input picture and the format up-converted picture, and generating an enhancement bitstream by encoding the calculated residual picture.

In accordance with another exemplary embodiment, there is provided a multilayer picture encoding apparatus for encoding an input picture for each layer independently. The multilayer picture encoding apparatus includes a lower layer encoder for generating a lower layer bitstream by encoding a format down-converted input picture; a format up-converter for performing format up-conversion by adaptively or selectively applying a 1-dimensional (1-D) prediction filter to a picture of the lower layer depending on whether a lower layer prediction flag is set or not; a residual determiner for calculating a residual picture between the input picture and the format up-converted picture; and a residual encoder for generating an enhancement bitstream by encoding the calculated residual picture.

In accordance with further another exemplary embodiment, there is provided a multilayer picture decoding method for decoding layer pictures. The multilayer picture decoding method includes outputting a lower layer picture by decoding a lower layer bitstream; outputting a residual picture by decoding an enhancement layer bitstream; performing format up-conversion by adaptively or selectively applying 1-dimensional (1-D) prediction filter to the lower layer picture depending on whether a lower layer prediction flag is set or not; and restoring an enhancement layer picture by adding the residual picture to the format up-converted picture.

In accordance with yet another exemplary embodiment, there is provided a multilayer picture decoding apparatus for decoding layer pictures. The multilayer picture decoding apparatus includes a lower layer decoder for outputting a lower layer picture by decoding a lower layer bitstream; a residual decoder for outputting a residual picture by decoding an enhancement layer bitstream; a format up-converter for performing format up-conversion by adaptively or selectively applying 1-dimensional (1-D) prediction filter to the lower layer picture depending on whether a lower layer prediction flag is set or not; and a picture restorer for restoring an enhancement layer picture by adding the residual picture to the format up-converted picture.

BRIEF DESCRIPTION OF THE DRAWINGS

The above and other features and aspects of certain exemplary embodiments will be more apparent from the following description taken in conjunction with the accompanying drawings, in which.

DETAILED DESCRIPTION OF EXEMPLARY EMBODIMENTS

Exemplary embodiments will now be described in detail with reference to the accompanying drawings. In the following description, specific details such as types of codecs (e.g., H.264 and VC-1) are merely provided to assist the overall understanding of exemplary embodiments. Therefore, it should be apparent to those skilled in the art that various changes and modifications of the exemplary embodiments described herein can be made without departing from the scope and spirit of the invention. In addition, descriptions of well-known functions and constructions are omitted for clarity and conciseness.

For convenience of description, the exemplary embodiments involve a multilayer picture encoding/decoding scheme that processes 3-layer pictures including pictures of one base layer and pictures of two enhancement layers. The term '3-layer encoding' as used herein may refer to generating three bitstreams, and the term '3-layer decoding' as used herein may refer to restoring three pictures. The number of layers may be determined depending on application scenarios, and hence, there may be more or less layers.

Figure 1:
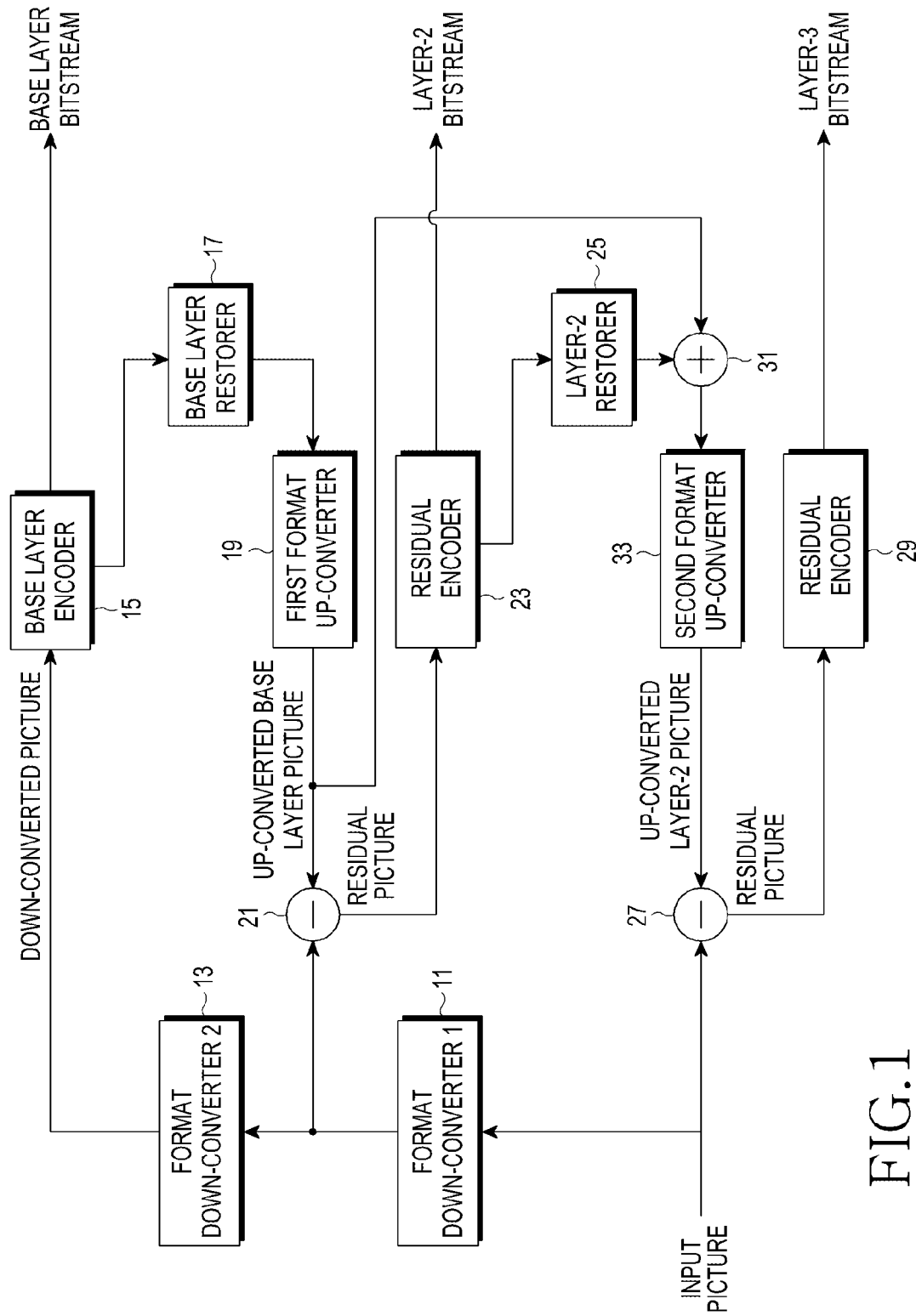
FIG. 1 illustrates a structure of a multilayer picture encoding apparatus according to an exemplary embodiment.

FIG. 1 illustrates a structure of a multilayer picture encoding apparatus according to an exemplary embodiment.

In the example of FIG. 1, for 3-layer encoding, an original input picture is down-converted twice. Through this process, two pictures are generated from the original input picture. It is assumed that a twice down-converted picture is a base layer picture, a once down-converted picture is a layer-2 picture, and the original input picture is a layer-3 picture.

The base layer picture is used to generate a base layer bitstream by being encoded by any standard video codec. The encoding apparatus in FIG. 1 generates a layer-2 bitstream by encoding a residual picture from a difference between a layer-2 picture and an up-converted base layer picture, which is obtained by restoring the base layer picture, and then has undergone format up-conversion. In addition, the encoding apparatus generates a layer-3 bitstream by encoding a residual picture from a difference between the original input picture (or a layer-3 picture) and an up-converted layer-2 picture, which is obtained by restoring the layer-2 picture and synthesizing it with the up-converted base layer picture, and then has undergone format up-conversion. In this manner, N-layer bitstreams may be generated (where N≥4). This process will be described in detail with reference to FIG. 1.

The encoding apparatus sequentially down-converts the input picture (or original picture) by means of a first format down-converter 11 and a second format down-converter 13. Through this process, two pictures are generated from the original picture. A picture down-converted twice from the input picture, i.e., a picture output from the second format down-converter 13, is a base layer picture. A picture down-converted once from the input picture, i.e., a picture output from the first format down-converter 11, is a layer-2 picture. The original input picture is a layer-3 picture. A base layer bitstream is generated by encoding the base layer picture in a base layer encoder 15. The base layer encoder 15 may include any standard video codec such as VC-1 and H.264.

A residual encoder 23 generates a layer-2 bitstream by encoding a residual picture. Here, the residual picture is a difference between the layer-2 picture and an up-converted base layer picture, which is obtained by restoring the base layer picture and then has undergone format up-conversion. A base layer restorer 17 restores the base layer picture, and the restored base layer picture undergoes format up-conversion in a first format up-converter 19. A first residual determiner 21 outputs the residual picture by calculating a difference between the layer-2 picture and the picture having undergone format up-conversion, i.e., the up-converted base layer picture. In the alternative, the first residual determiner 21 may be a detector that detects a difference between the layer-2 picture and the up-converted base layer picture having undergone format up-conversion. Herein, the first residual determiner 21 may be construed as a detector.

A layer-2 restorer 25 restores the layer-2 picture output from a residual encoder 23. The restored layer-2 picture is added to the picture output from the first format up-converter 19 in a synthesizer 31. An output of the synthesizer 31 undergoes format up-conversion in a second format up-converter 33. A second residual determiner 27 outputs a residual picture by calculating a difference between the layer-3 picture (or input picture) and the up-converted layer-2 picture having undergone format up-conversion. A residual encoder 29 generates a layer-3 bitstream by encoding the residual picture output from the second residual determiner 27. Although the encoding apparatus in FIG. 1 encodes multilayer pictures including a base layer picture, a layer-2 picture, and a layer-3 picture by way of example, the encoding apparatus may generate N-layer bitstreams (where N≥4) in the same manner.

A multilayer picture decoding apparatus according to an exemplary embodiment will now be described with reference to FIG. 2. It is to be noted that the multilayer picture decoding apparatus may decode bitstreams of respective layers, which were encoded not only by the multilayer picture encoding apparatus in FIG. 1, but also by using residual pictures.

Figure 2:
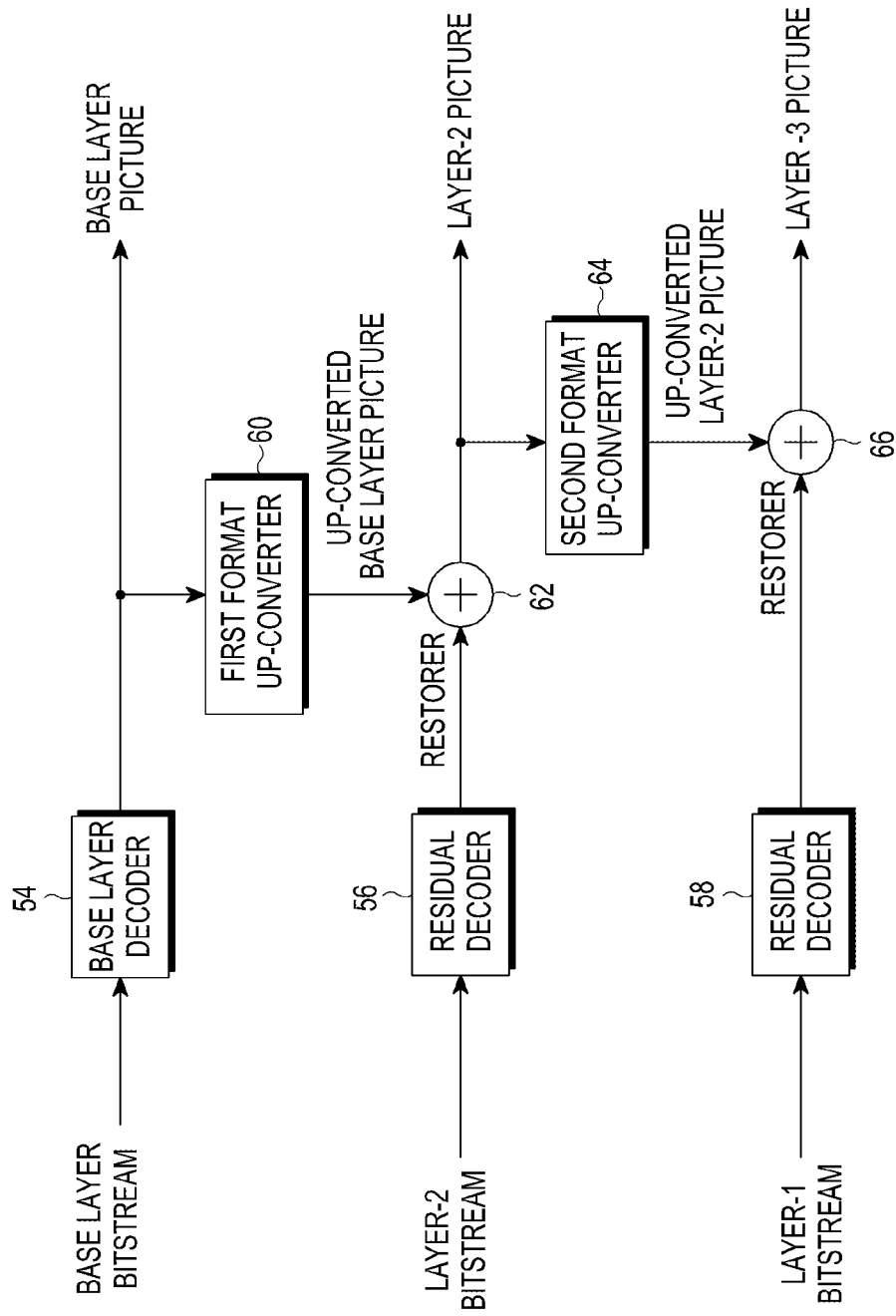
FIG. 2 illustrates a structure of a multilayer picture decoding apparatus according to an exemplary embodiment.

FIG. 2 illustrates a structure of a multilayer picture decoding apparatus according to an exemplary embodiment.

The multilayer picture decoding apparatus in FIG. 2 restores a base layer picture by decoding a base layer bitstream using any standard video codec such as VC-1 and H.264. The decoding apparatus decodes a layer-2 bitstream using a residual codec, and restores a layer-2 picture by adding the decoded layer-2 residual picture to an up-converted base layer picture obtained by performing format up-conversion on the decoded base layer picture. In addition, the decoding apparatus decodes a layer-3 bitstream using a residual codec, and restores a layer-3 picture by adding the decoded layer-3 residual picture to an up-converted layer-2 picture obtained by performing format up-conversion on the decoded layer-2 picture. In this manner, the decoding apparatus may restore N-layer pictures (where N≥4). This process will be described in detail with reference to FIG. 2.

Referring to FIG. 2, a base layer decoder 54 restores a base layer picture by decoding a base layer bitstream. The base layer decoder 54 may include any standard video codec such as VC-1 and H.264. A residual decoder 56 outputs a residual picture by decoding a layer-2 bitstream. Outputting the residual picture by decoding the layer-2 bitstream may be understood with reference to the encoding process shown in FIG. 1. In other words, with reference to FIG. 1, the layer-2 bitstream generated by the residual encoder 23 is a layer-2 bitstream obtained by encoding the residual picture detected by the residual determiner 21. Therefore, a residual picture may be obtained by decoding this layer-2 bitstream.

The residual decoder 56 outputs a layer-2 residual picture by decoding the layer-2 bitstream. A layer-2 picture restorer 62 restores a layer-2 picture by adding the layer-2 residual picture to an up-converted base layer picture, which is obtained by performing format up-conversion on the decoded base layer picture by means of a first format up-converter 60.

A residual decoder 58 outputs a layer-3 residual picture by decoding a layer-3 bitstream. A layer-3 picture restorer 66 restores a layer-3 picture by adding the layer-3 residual picture to the up-converted layer-2 picture. The up-converted layer-2 picture is obtained by performing format up-conversion on the decoded layer-2 picture by means of a second format up-converter 64. In this manner, N-layer pictures may be restored (where N≥4).

Figure 3:
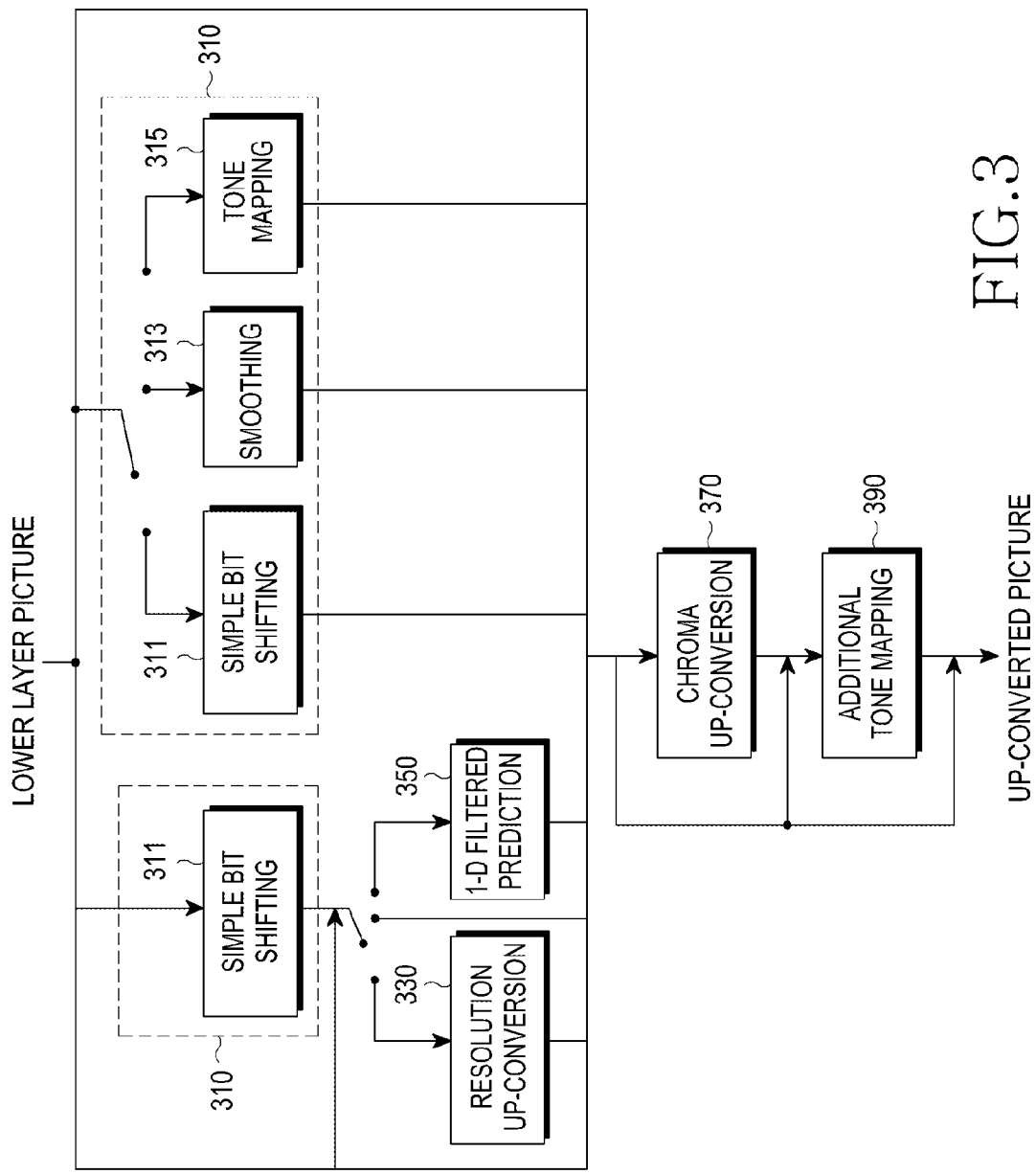
FIG. 3 illustrates a picture conversion order necessary for format up-conversion in FIGS. 1 and 2.

FIG. 3 illustrates a picture conversion order necessary for format up-conversion in FIGS. 1 and 2.

In the example of FIG. 2, format up-conversion is a process of matching formats of pictures in different layers. Because an enhancement layer represents higher-quality pictures compared with a lower layer, format conversion of format up-conversion is required. For inter-layer picture conversion, bit depth up-conversion, resolution up-conversion, chroma up-conversion, and tone mapping methods may be used. Two or more conversions may be performed simultaneously. The bit depth up-conversion is performed based on any one of simple bit shifting, smoothing, and tone mapping.

In other words, depending on the importance affecting the quality and on the characteristics of lower layer pictures and enhancement layer pictures, the picture conversion may be performed in order of, for example, bit depth up-conversion 310=>resolution up-conversion 330=>chroma up-conversion 370=>additional tone mapping 390, as shown in FIG. 3.

As another example, the picture conversion may be sequentially performed in order of bit depth up-conversion 310=>1-D filtered prediction 350=>chroma up-conversion 370=>additional tone mapping 390. As another example, the picture conversion may be sequentially performed in order of bit depth up-conversion 310=>chroma up-conversion 370=>additional tone mapping 390. As another example, the picture conversion may be sequentially performed in order of bit depth up-conversion 310=>resolution up-conversion 330=>additional tone mapping 390. Although not described, the picture conversion order illustrated in FIG. 3 may be changed in other exemplary embodiments.

Combinations of picture conversions may be determined depending on applications. The order of picture conversions may be determined to maintain the picture characteristics (or qualities) if possible, and the order of picture conversions may always be maintained constant according to the importance of picture conversions.

Describing each conversion, the bit depth up-conversion 310 is for converting the expression unit of pixels representing pictures. For example, a picture of a base layer (or lower layer) needs 8 bits to represent one pixel, whereas a picture of an enhancement layer (or higher layer) needs 10 or 12 bits to represent one pixel. An increase in bit depth increases a dynamic range of pictures, making it possible to represent high-quality pictures.

In the case of the bit depth up-conversion 310, any one of the following three methods may be selected. The three methods include a conversion method based on simple bit shifting 311, a conversion method based on smoothing 313 for which a 2D-spatial filter is used, and a conversion method based on tone mapping 315. The conversion method based on simple bit shifting 311 is for converting a bit depth by simply shifting bits. The conversion method based on smoothing 313 may have an additional effect of cancelling noises when converting a bit depth. The conversion method based on tone mapping 315 is for converting a bit depth not linearly but nonlinearly, making it possible to restore pictures which are close to the original picture in terms of the bit depth.

The chroma up-conversion 370 is for expanding chroma samples representing one picture. For example, if chroma samples of a lower layer picture are YCbCr4:2:0, 4 Y values, 1 Cb value and 1 Cr value are needed to represent 4 pixels. If chroma samples of an enhancement layer picture are converted into YCbCr4:2:2, 4 Y values, 2 Cb values, and 2 Cr values are needed to represent 4 pixels.

The additional tone mapping 390 is a method for converting a given bit depth not linearly but nonlinearly, making it possible to restore pictures which are close to the original picture in terms of the bit depth. However, if the enhancement layer pictures are equal to the lower layer pictures in resolution, the additional tone mapping 390 may be applied when the 1-D prediction filter is not applied to the lower layer pictures and bit depth up-conversion is simple bit shifting of smoothing. In addition, the additional tone mapping 390 may be selectively applied when the enhancement layer pictures are different from the lower layer pictures in resolution, or when 1-D prediction filter is applied.

Particularly, a format up-converter according to an exemplary embodiment performs 1-D filtering by applying a 1-D prediction filter to a lower layer picture received from a lower layer, in order to reduce a dynamic range of residual pictures occurring in an enhancement layer. This 1-D filtering is performed only when a lower layer prediction flag is preset (e.g., LOWER_LAYER_PRED_FLAG==1) in a bitstream syntax of a sequence layer as in Table 1 below. Table 1 illustrates an example of a bitstream syntax of a sequence layer, which is information necessary for performing picture conversion in a format up-converter of the multilayer picture encoding/decoding apparatus, showing a picture conversion process when a lower layer prediction flag is preset.

TABLE 1

| SEQUENCE LAYER( ) { | Number of bits | Descriptor |
|---|---|---|
| ............................... | | |
| LOWER_LAYER_PRED_FLAG | 1 | Uimsbf |
| if((PICTURE_WIDTH == LOWER_PICTURE_WIDTH) && (PICTURE_HEIGHT == LOWER_PICTURE_HEIGHT) && (LOWER_LAYER_PRED_FLAG == 0)) { | | |
| BIT_UPCONVERSION | 2 | Uimsbf |
| if(BIT_UPCONVERSION == 1 \|\| BIT_UPCONVERSION == 3) { | | |
| ENHANCEMENT_LAYER_TONE_MAP_FLAG | 1 | Uimsbf |
| } | | |
| if(BIT_UPCONVERSION == 3) { | | |

TABLE 1-continued

| SEQUENCE LAYER( ) { | Number of bits | Descriptor |
|---|---|---|
|       SMOOTHING_WND | 2 | Uimsbf |
|       SMOOTHING_TH_MINUS_1 | 2 | Uimsbf |
|   } | | |
| else { | | |
|   if(BIT_DEPTH_MINUS_8 != LOWER_BIT_DEPTH_MINUS_8) { | | |
| ENHANCEMENT_LAYER_TONE_MAP_FLAG | 1 | Uimsbf |
|   } | | |
| } | | |
| COLOR_DIFFERENCE_UPCONVERSION | 2 | Uimsbf |
| if(ENHANCEMENT_LAYER_TONE_MAP_FLAG || ( (PICTURE_HEIGHT == LOWER_PICTURE_HEIGHT) && (PICTURE_HEIGHT == LOWER_PICTURE_HEIGHT) && (BIT_UPCONVERSION == 2) ) ) { | | |
|     Y_NUM_LINEAR_SEGMENTS | 16 | Uimsbf |
|     Y_LENGTH_OF_FLC_X_MINUS_1 | 4 | Uimsbf |
|     Y_LENGTH_OF_FLC_Y_MINUS_1 | 4 | Uimsbf |
|     for(i=0; i <= Y_NUM_LINEAR_SEGMENTS; i++) { | | |
|       Y_MAP_PARA_X[i] | variable size | Uimsbf |
|       Y_MAP_PARA_Y[i] | variable size | Uimsbf |
|     } | | |
|     U_NUM_LINEAR_SEGMENTS | 16 | Uimsbf |
|     U_LENGTH_OF_FLC_X_MINUS_1 | 4 | Uimsbf |
|     U_LENGTH_OF_FLC_Y_MINUS_1 | 4 | Uimsbf |
|     for(i=0; i <= U_NUM_LINEAR_SEGMENTS; i++) { | | |
|       U_MAP_PARA_X[i] | variable size | Uimsbf |
|       U_MAP_PARA_Y[i] | variable size | Uimsbf |
|     } | | |
|     V_NUM_LINEAR_SEGMENTS | 16 | Uimsbf |
|     V_LENGTH_OF_FLC_X_MINUS_1 | 4 | Uimsbf |
|     V_LENGTH_OF_FLC_Y_MINUS_1 | 4 | Uimsbf |
|     for(i=0; i <= V_NUM_LINEAR_SEGMENTS; i++) { | | |
|       V_MAP_PARA_X[i] | variable size | Uimsbf |
|       V_MAP_PARA_Y[i] | variable size | Uimsbf |
|     } | | |
| } | | |
| ........................ | | |
| ALIGNtoBYTE ( ) | | |
| } | | |

In other words, the format up-converter according to an exemplary embodiment performs 1-D filtering by applying a 1-D prediction filter in resolution up-conversion 330 or 1-D Filtered Prediction 350, if a lower layer prediction flag is preset (e.g., LOWER_LAYER_PRED_FLAG=1) in a bitstream syntax of a sequence layer.

When resolution up-conversion 330 or 1-D filtered prediction 350 is performed with bit depth up-conversion 310 in generating restored pictures, only the simple bit shifting 311 in the bit depth up-conversion 310 may be used. This is because they may be simultaneously performed by manipulating the divisor (denominator) of the filter used for resolution conversion and 1-D filtered prediction.

A detailed description will now be made of a method for performing 1-D filtering in resolution up-conversion 330 or 1-D filtered prediction 350 depending on resolutions of enhancement layer pictures and lower layer pictures when a lower layer prediction flag is preset (LOWER_LAYER_PRED_FLAG=1) in a bitstream syntax of a sequence layer in the format up-converter.

The format up-converter applies a 1-D prediction filter only in the horizontal direction to convert the pictures restored in lower layers into predicted enhancement layer pictures, if enhancement layer pictures are equal to lower layer pictures in resolution.

If enhancement layer pictures are different from lower layer pictures in resolution, the format up-converter performs vertical up-conversion using a default filter and performs horizontal up-conversion using an alternative filter in a resolution up-conversion process. The alternative filter is a filter having a coefficient generated by performing convolution on a default filter's coefficient and a 1-D prediction filter's coefficient. If enhancement layer pictures are different from lower layer pictures in resolution and the 1-D prediction filter is unused (e.g., LOWER_LAYER_PRED_FLAG=0), the format up-converter performs resolution up-conversion 330 by applying the default filter for resolution up-conversion in horizontal and vertical directions in the conventional method. The two different-direction filters are the same.

As a result, in the multilayer picture encoding/decoding apparatus according to an exemplary embodiment, if a lower layer prediction flag is set, the format up-converter performs 1-D filtered prediction, thereby reducing the dynamic range of residual pictures, the computation, and the complexity, and thus making it possible for the multilayer picture encoding/decoding apparatus to be used in applications requiring low complexity like the mobile environments.

The methods of the exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations by a computer or a processor.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A multilayer picture decoding method for decoding layer pictures, by apparatus for multilayer picture decoding, comprising:
   outputting a lower layer picture by decoding a lower layer bitstream;
   outputting a residual picture by decoding an enhancement layer bitstream;
   performing format up-conversion on the lower layer picture; and
   restoring an enhancement layer picture by adding the residual picture to the format up-converted picture.

2. The multilayer picture decoding method of claim 1, wherein performing format up-conversion by depending on whether a lower layer prediction flag is set or not set, to generate a format up-converted picture.

3. The multilayer picture decoding method of claim 1, wherein the performing of format up-conversion comprises:
   determining whether the lower layer picture is equal to the residual picture in resolution, if the lower layer prediction flag is set.

4. The multilayer picture decoding method of claim 3, wherein the performing of format up-conversion further comprises:
   performing format up-conversion by applying a 1-D prediction filter to the lower layer picture in a horizontal direction, if the lower layer picture is equal to the residual picture in resolution; and
   performing format up-conversion by applying a default filter to the lower layer picture in a vertical direction and applying an alternative filter to the lower layer picture in a horizontal direction, if the lower layer picture is different from the residual picture in resolution.

5. A multilayer picture encoding method for encoding an input picture for each layer independently, by apparatus for multilayer picture encoding, comprising:
   generating a lower layer bitstream by encoding the input picture;
   performing format up-conversion by applying a 1-dimensional (1-D) prediction filter to a lower layer picture depending on whether a lower layer prediction flag is set or not set; and
   generating an enhancement layer bitstream by encoding a residual picture from a difference between an enhancement layer picture and the up-converted lower layer picture.

6. The multilayer picture encoding method of claim 5, wherein the performing of format up-conversion comprises:
   determining whether a resolution of the lower layer picture is equal to a resolution of the input picture, if the lower layer prediction flag is set;
   performing first format up-conversion by applying the 1-D prediction filter to the lower layer picture in a horizontal direction, if the resolution of the lower layer picture is equal to resolution of the input picture; and
   performing second format up-conversion by applying a default filter to the lower layer picture in a vertical direction and applying an alternative filter to the lower layer picture in the horizontal direction, if the resolution of the lower layer picture is different from the resolution of the input picture.

7. A multilayer picture decoding apparatus for decoding layer pictures, comprising:
   a lower layer decoder for outputting a lower layer picture by decoding a lower layer bitstream;
   a residual decoder for outputting a residual picture by decoding an enhancement layer bitstream;
   a format up-converter for performing format up-conversion on the lower layer picture; and
   a picture restorer for restoring an enhancement layer picture by adding the residual picture to the format up-converted picture.

8. The multilayer picture decoding apparatus of claim 7, wherein the format up-converter performs format up-conversion by depending on whether a lower layer prediction flag is set or not set, to generate a format up-converted picture.

9. The multilayer picture decoding apparatus of claim 7, wherein the format up-converter determines whether the lower layer picture is equal to the residual picture in resolution, if the lower layer prediction flag is set.

10. The multilayer picture decoding apparatus of claim 9, wherein the format up-converter,
    performs format up-conversion by applying a 1-D prediction filter to the lower layer picture in a horizontal direction, if the lower layer picture is equal to the residual picture in resolution; and
    performs format up-conversion by applying a default filter to the lower layer picture in a vertical direction and applying an alternative filter to the lower layer picture in a horizontal direction, if the lower layer picture is different from the residual picture in resolution.

11. A multilayer picture encoding apparatus for encoding an input picture for each layer independently, comprising:
    a lower layer encoder for generating a lower layer bitstream by encoding the input picture;
    a format up-converter for performing format up-conversion by applying a 1-dimensional (1-D) prediction filter to a lower layer picture depending on whether a lower layer prediction flag is set or not set; and
    a residual encoder for generating a an enhancement layer bitstream by encoding a residual picture from a difference between a an enhancement layer picture and the up-converted lower layer picture.

12. The multilayer picture encoding apparatus of claim 11, wherein format up-converter,
    determines whether a resolution of the lower layer picture is equal to a resolution of the input picture, if the lower layer prediction flag is set;
    performs first format up-conversion by applying the 1-D prediction filter to the lower layer picture in a horizontal direction, if the resolution of the lower layer picture is equal to resolution of the input picture; and performs second format up-conversion by applying a default filter to the lower layer picture in a vertical direction and applying an alternative filter to the lower layer picture in the horizontal direction, if the resolution of the lower layer picture is different from the resolution of the input picture.

\* \* \* \* \*